(12) United States Patent
Kravitz et al.

(10) Patent No.: US 9,529,640 B2
(45) Date of Patent: *Dec. 27, 2016

(54) WORK REQUEST PROCESSOR

(71) Applicant: Cavium, Inc., San Jose, CA (US)

(72) Inventors: David Kravitz, Cambridge, MA (US); Daniel E. Dever, North Brookfield, MA (US); Wilson P. Snyder, II, Hilliston, MA (US)

(73) Assignee: Cavium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,934

(22) Filed: Mar. 27, 2015

(65) Prior Publication Data

US 2015/0205640 A1 Jul. 23, 2015

Related U.S. Application Data

(63) Continuation of application No. 13/285,773, filed on Oct. 31, 2011, now Pat. No. 9,059,945.

(51) Int. Cl.
| | |
|---|---|
| *G06F 9/46* | (2006.01) |
| *G06F 9/50* | (2006.01) |
| *G06F 9/48* | (2006.01) |
| *H04L 12/861* | (2013.01) |

(52) U.S. Cl.
CPC ........... *G06F 9/5083* (2013.01); *G06F 9/4881* (2013.01); *G06F 9/50* (2013.01); *H04L 49/90* (2013.01)

(58) Field of Classification Search
CPC ........ G06F 9/4881; G06F 9/5083; G06F 9/50; H04L 49/90

USPC .......................................................... 718/105
See application file for complete search history.

(56) References Cited

U.S. PATENT DOCUMENTS

| | | | | |
|---|---|---|---|---|
| 6,055,579 A | * | 4/2000 | Goyal | G06F 9/4881 712/28 |
| 6,434,681 B1 | * | 8/2002 | Armangau | G06F 11/1466 711/162 |
| 2003/0061417 A1 | * | 3/2003 | Craddock | G06F 9/546 710/54 |
| 2012/0101973 A1 | | 4/2012 | Ito et al. | |

OTHER PUBLICATIONS

"Cavium Networks Unveils Octeon II CN68XX—Industry's Highest-Performance Multi-Core Processors for Energy-Efficient Data Center, Mobile Internet and the Borderless Enterprise" (May 10, 2010).

* cited by examiner

*Primary Examiner* — Camquy Truong
(74) *Attorney, Agent, or Firm* — Hamilton, Brook, Smith & Reynolds, P.C.

(57) ABSTRACT

A network processor includes a schedule, sync and order (SSO) module for scheduling and assigning work to multiple processors. The SSO includes an on-deck unit (ODU) that provides a table having several entries, each entry storing a respective work queue entry, and a number of lists. Each of the lists may be associated with a respective processor configured to execute the work, and includes pointers to entries in the table. pointer is added to the list based on an indication of whether the associated processor accepts the WQE corresponding to the pointer.

14 Claims, 6 Drawing Sheets

WORK REQUEST PROCESSOR

RELATED APPLICATION

This application is a continuation of U.S. application Ser. No. 13/285,773, filed Oct. 31, 2011. The entire teachings of the above application are incorporated herein by reference.

BACKGROUND

Typical network processors schedule and queue work such as packet processing operations for upper level network protocols, and allow processing with respect to upper level network protocols (e.g., transport and application layers) in received packets before forwarding the packets to connected devices. The functions typically performed by network processors include packet filtering, queue management and priority, quality of service enforcement, and access control. By employing features specific to processing packet data, network processors can optimize an interface of a networked device.

SUMMARY

Embodiments of the present invention provide a system for processing work requests in a network. An add work engine (AWE) forwards a work queue entry (WQE) to one of a plurality of input queues (IQs). An on-deck unit (ODU) provides a table having several entries, each entry storing a respective WQE, and a number of lists. Each of the lists may be associated with a respective processor configured to execute WQEs, and includes pointers to entries in the table. pointer is added to the list based on an indication of whether the associated processor accepts the WQE corresponding to the pointer. get work engine (GWE) moves WQEs from the plurality of IQs to the table of the ODU.

In further embodiments, the indication of acceptance is received from the associated processor itself, and can be based on a number of factors, such as a work group corresponding to the WQE, a comparison of a priority of the WQE against a priority of other WQEs stored at the list, or an identifier of the IQ storing the WQE.

In still further embodiments, the system can include a number of work slots. Each work slot can be associated with a respective processor and configured to receive a WQE from the list associated with the processor. The respective processor may execute the WQE at the work slot. The lists can include pointers to a common WQE in the table. Further, each of the lists can include pointers to a common WQE at the table, and each of the lists may be updated by removing a pointer when the associated WQE is moved to a work slot of a processor not associated with the list.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Before describing example embodiments of the present invention in detail, an example network security processor in which the embodiments may be implemented is described immediately below to help the reader understand the inventive features of the present invention.

Figure 1:
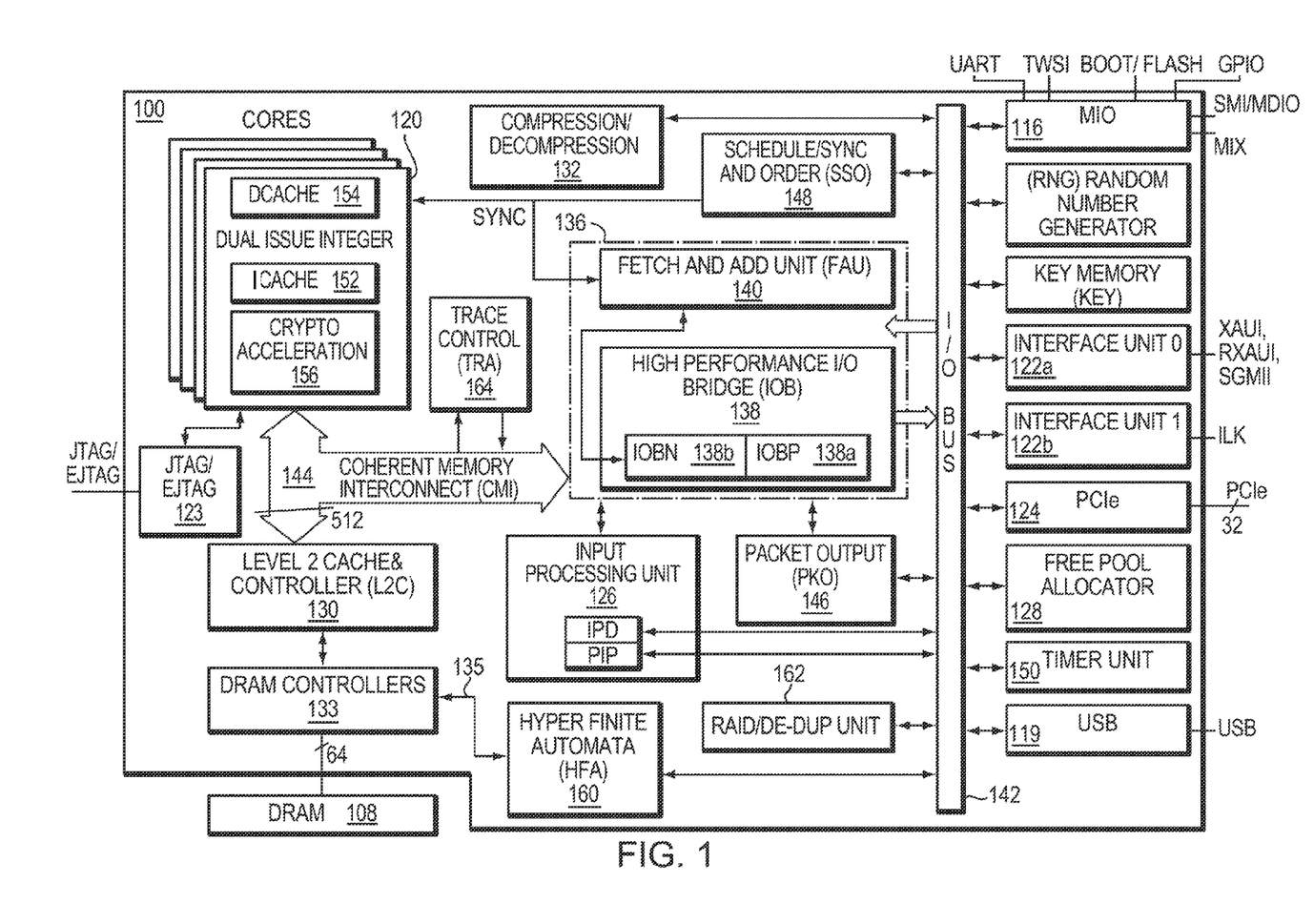
FIG. 1 is a block diagram illustrating a network services processor in which embodiments of the present invention may be implemented.

FIG. 1 is a block diagram illustrating a network services processor 100. The network services processor 100 delivers high application performance using at least one processor core 120.

The network services processor 100 processes Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by a plurality of interface units 122. packet can also be received by a PCI interface 124. The interface unit 122 performs pre-processing of the received packet by checking various fields in the L2 network protocol header included in the received packet and then forwards the packet to a packet input unit 126. At least one interface unit 122a can receive packets from a plurality of X Attachment Unit Interfaces (XAUI), Reduced X Attachment Unit Interfaces (RXAUI), or Serial Gigabit Media Independent Interfaces (SGMII). At least one interface unit 122b can receive connections from an Interlaken Interface (ILK).

The packet input unit 126 performs further pre-processing of network protocol headers (e.g., L3 and L4 headers) included in the received packet. The pre-processing includes checksum checks for TCP/User Datagram Protocol (UDP) (L3 network protocols).

A free-pool allocator 128 maintains pools of pointers to free memory in Level-2 cache memory 130 and external DRAM 108. The packet input unit 126 uses one of the pools of pointers to store received packet data in Level-2 cache memory 130 or external DRAM 108 and another of the pools of pointers to allocate work queue entries for the processor cores 120.

The packet input unit 126 then writes packet data into buffers in Level-2 cache 130 or external DRAM 108. Preferably, the packet data is written into the buffers in a format convenient to higher-layer software executed in at least one of the processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets. Other embodiments of co-processing units include the RAID/De-Dup Unit 162, which accelerates data striping and data duplication processing for disk-storage applications.

Another co-processor is a Hyper Finite Automata (HFA) unit 160 which includes dedicated HFA thread engines adapted to accelerate pattern and/or signature matching necessary for anti-virus, intrusion-detection systems and other content-processing applications. Using a HFA unit 160, pattern and/or signature matching is accelerated, for example being performed at rates upwards of multiples of tens of gigabits per second. The HFA unit 160, in some embodiments, could include any of a Deterministic Finite Automata (DFA), Non-deterministic Finite Automata (NFA), or HFA algorithm unit.

An I/O interface 136 manages the overall protocol and arbitration and provides coherent I/O partitioning. The I/O interface 136 includes an I/O bridge 138 and a fetch-and-add unit 140. The I/O Bridge includes two bridges, an I/O Packet Bridge (IOBP) 138a and an I/O Bus Bridge (IOBN) 138b. The I/O Packet Bridge 138a is configured to manage the overall protocol and arbitration and provide coherent I/O portioning with primarily packet input and output. The I/O Bus Bridge 138b is configured to manage the overall protocol and arbitration and provide coherent I/O portioning with primarily the I/O Bus. Registers in the fetch-and-add unit 140 are used to maintain lengths of the output queues that are used for forwarding processed packets through a packet output unit 146. The I/O bridge 138 includes buffer queues for storing information to be transferred between a coherent memory interconnect (CMI) 144, an I/O bus 142, the packet input unit 126, and the packet output unit 146.

The miscellaneous I/O interface (MIO) 116 can include auxiliary interfaces such as General Purpose I/O (GPIO), Flash, IEEE 802 two-wire Management Data I/O Interface (MDIO), Serial Management Interface (SMI), Universal Asynchronous Receiver-Transmitters (UARTs), Reduced Gigabit Media Independent Interface (RGMII), Media Independent Interface (MII), two wire serial interface (TWSI) and other serial interfaces.

The network services provider 100 may also include a Joint Test Action Group ("JTAG") Interface 123 supporting the MIPS EJTAG standard. According to the JTAG and MIPS EJTAG standards, a plurality of cores within the network services provider 100 will each have an internal Test Access Port ("TAP") controller. This allows multi-core debug support of the network services provider 100.

A Schedule/Sync and Order (SSO) module 148 queues and schedules work for the processor cores 120. Work is queued by adding a work queue entry to a queue. For example, a work queue entry is added by the packet input unit 126 for each packet arrival. timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154, and crypto-acceleration 156. In one embodiment, the network services processor 100 includes 32 superscalar Reduced Instruction Set Computer (RISC)-type processor cores 120. In some embodiments, each of the superscalar RISC-type processor cores 120 includes an extension of the MIPS64 version 3 processor core. In one embodiment, each of the superscalar RISC-type processor cores 120 includes a cnMIPS II processor core.

Level-2 cache memory 130 and external DRAM 108 are shared by all of the processor cores 120 and I/O co-processor devices. Each processor core 120 is coupled to the Level-2 cache memory 130 by the CMI 144. The CMI 144 is a communication channel for all memory and I/O transactions between the processor cores 120, the I/O interface 136 and the Level-2 cache memory 130 and controller. In one embodiment, the CMI 144 is scalable to 32 processor cores 120, supporting fully-coherent Level-1 data caches 154 with write through. Preferably the CMI 144 is highly-buffered with the ability to prioritize I/O. The CMI is coupled to a trace control unit 164 configured capture bus request so software can later read the request and generate a trace of the sequence of events on the CMI.

The Level-2 cache memory controller 131 maintains memory reference coherence. It returns the latest copy of a block for every fill request, whether the block is stored in Level-2 cache memory 130, in external DRAM 108, or is "in-flight." It also stores a duplicate copy of the tags for the data cache 154 in each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a plurality of DRAM controllers 133 supports up to 128 gigabytes of DRAM. In one embodiment, the plurality of DRAM controllers includes four DRAM controllers, each of the DRAM controllers supporting 32 gigabytes of DRAM. Preferably, each DRAM controller 133 supports a 64-bit interface to DRAM 108. Additionally, the DRAM controller 133 can supports preferred protocols, such as the DDR-III protocol.

After a packet has been processed by the processor cores 120, the packet output unit 146 reads the packet data from the Level-2 cache memory 130, DRAM 108, performs L4 network protocol post-processing (e.g., generates a TCP/UDP checksum), forwards the packet through the interface units 122 or the PCI interface 124 and frees the L2 cache memory 130/DRAM 108 used by the packet.

The DRAM Controllers 133 manages in-flight transactions (loads/stores) to/from the DRAM 108. In some embodiments, the DRAM Controllers 133 include four DRAM controllers, the DRAM 108 includes four DRAM memories, and each DRAM controller is connected to a DRAM memory. The DFA unit 160 is coupled directly to the DRAM Controllers 133 on a bypass-cache access path 135. The bypass-cache access path 135 allows the HFA Unit to read directly from the memory without using the Level-2 cache memory 130, which can improve efficiency for HFA operations.

Embodiments of the present invention may be implemented in the network services processor 100 shown in FIG. 1, and may be directed more particularly to the schedule, sync and order (SSO) module 148 and associated components. Example embodiments are described in further detail below with reference to FIGS. 2-5.

Figure 2:
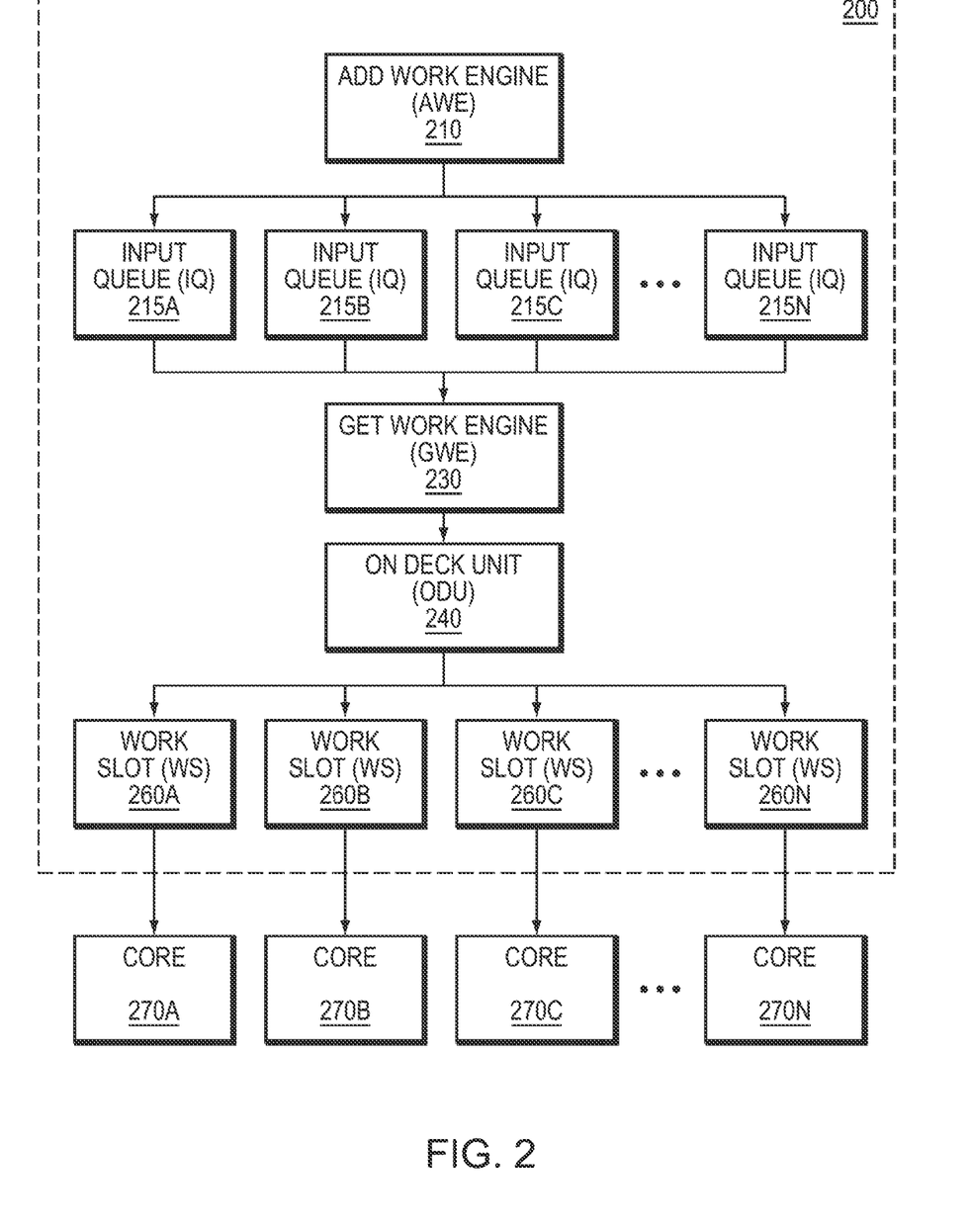
FIG. 2 is a block diagram of a system for scheduling and assigning work in one embodiment.

FIG. 2 is a block diagram of a schedule, sync and order (SSO) module 200 in one embodiment. The SSO module 200 may be implemented in the network processor 100 (as SSO module 200) described above with reference to FIG. 1, and operates to queue and schedule work for multiple processor cores 270A-N. The SSO module 200 includes an add work engine (AWE) 210, which receives external requests to process packet data and creates work queue entries (WQEs) based on those requests. number of input queues (IQ) 215A-N store the WQEs. get work engine (GWE) 230 retrieves the WQEs from the IQs 215A-N, and an on deck unit (ODU) 240 schedules the work for assignment at the processor cores ("processors") 270A-N. A number of work slots (WS) 260A-N each correspond to a particular processor 270A-N, and hold a WQE for completion by the processor 270A-N. Additional components not shown, such as memory arrays and bus interfaces, may be implemented to support the operation of the above components.

Typical scheduling circuits for multiple processors have employed a work queue that is shared by the multiple processors, where each of the processors includes a work slot having a pointer to an entry in the work queue. In the case that several (or all) processors can execute the same work, a single task may be scheduled for several processors. As a result, only the first processor receives the work, the scheduling at the additional processors is invalidated, and those additional processors must wait for additional jobs to be added to the work queue.

Embodiments of the present invention provide for scheduling work for multiple processors at a high frequency while maximizing the work capacity of those processors. In an example process for scheduling and assigning work at the SSO 200, the AWE 210 adds a WQE to one of several (e.g., eight) IQs 215A-N. The GWE 230 traverses the IQs 215A-N and places pointers to executable WQEs into the ODU 240. When a processor 270A-N requests new work, the WS 260A-N associated with the processor 270A-N delivers the WQE referenced by the ODU's 240 pointer.

The ODU 240 may include a central multi-entry (e.g., 32-entry) table storing WQE information, and multiple (e.g., 32) lists each associated with a respective processor 260A-N, where each list can hold pointers to 4 multiple (e.g., 4) entries in the central table. The 4 pointer storage elements per list are also referred to as "slots." The pointers in each list may be sorted by priority, which is derived from the respective IQ 215A-N and which can be different across the 32 lists.

Operation of the ODU 240 in an example embodiment, in particular with respect to the scheduling of entries and the control and maintenance of the table and lists, is described below with reference to FIGS. 3-5.

Figure 3:
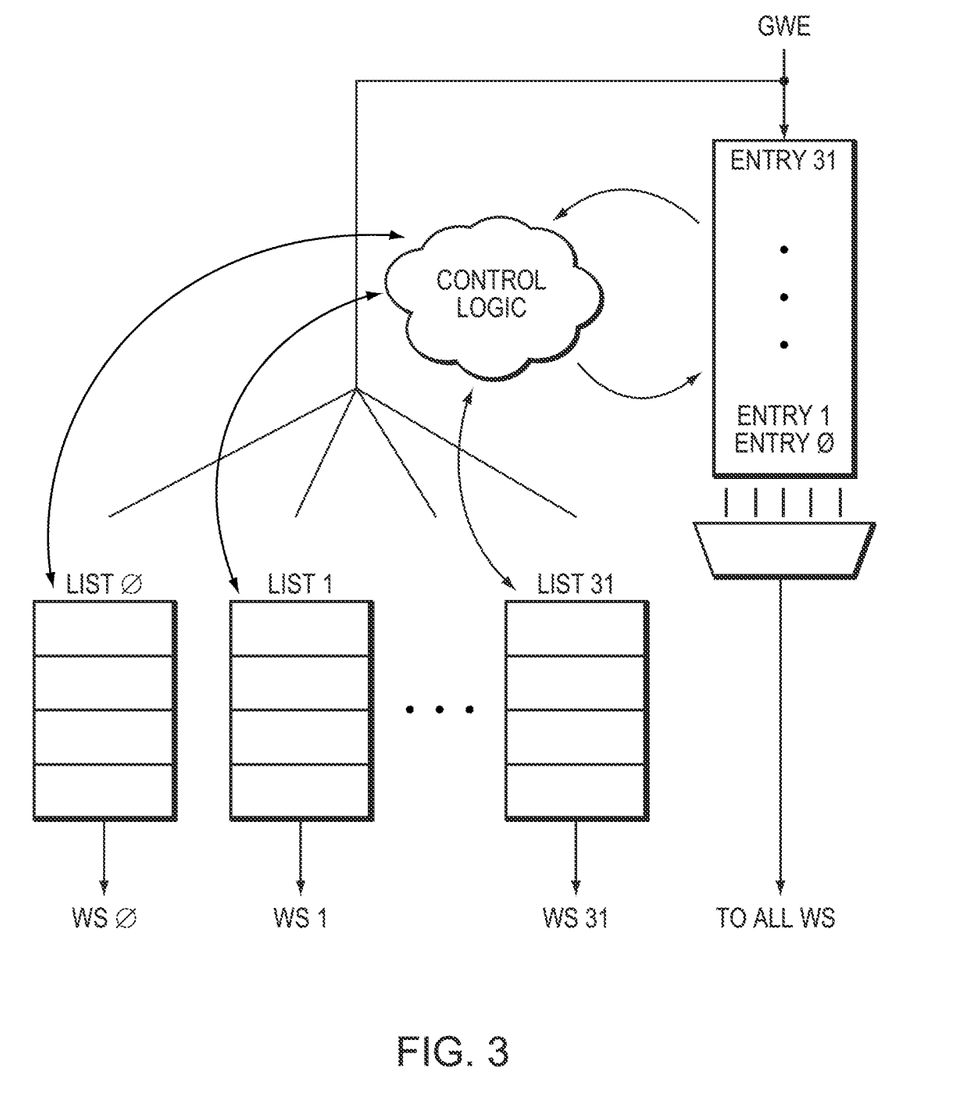
FIG. 3 is a block diagram of a top-level view of an on-deck unit (ODU) in one embodiment.

FIG. 3 is a block diagram of a top-level view of an on-deck unit (ODU) in one embodiment. With reference to FIG. 2, in this example embodiment, there are 32 Lists ("List0"-"List31"), one associated with each processor 270A-N and its respective WS 260A-N. The entry table includes 32 entries ("Entry0"-"Entry31"). The GWE 230 provides an indication of incoming WQEs to be provided to the ODU. In response to this indication, ODU control logic for each list determines whether to request to load an incoming WQE to that list. The entries compare a identifier ("idx") of the incoming WQE, which uniquely identifies the WQE against the valid identifiers in the table. If there is a match, and the entry is not pending, the entry number to be loaded into the lists will be the entry number where the memory value matches. If the entry is pending, no list is allowed to load the incoming WQE because the WS is already processing that WQE. If there is no match, the ODU looks for a free entry to use by finding the first entry that is both not-valid and corresponds to the number of a list that wants to load the incoming WQE. This behavior guarantees that a list that wants only uncommon WQEs will not be blocked by other, more requested WQEs occupying all the entries. If no entry satisfies the search criteria, the WQE is not loaded into the entry table nor any of the lists. If the WQE is to be loaded, the top-level logic sends the entry number to be used to all the lists, and also to the entry table if the WQE is not already loaded into an entry. If the WQE is not to be loaded, the top-level control logic sends control signals to the all the lists indicating not to load the WQE.

When information about a WQE is presented at the end of the GWE 230 pipeline, all 32 lists in the ODU 240 determine whether to use one of their slots for this WQE. The determination is based on a) whether the processor 270A-N associated with the list accepts work from a group the WQE belongs to (based on a group tag associated with the WQE), b) whether the priority of this WQE (based on a priority tag) is better than the worst-priority WQE stored in the lists' slots, and c) whether the list can accept work from the IQ 215A-N holding the WQE. For the purposes of (b), any slots in the list not pointing to valid WQEs may be treated as having a priority 1 degree lower than the worst permitted priority.

The ODU 240 examines the vector of lists that request using a slot for the incoming WQE and matches that vector against the state of the table. The ODU 240 assigns an entry number for the incoming WQE that is the first match of the intersection of lists that request the WQE and entries that are empty. The entry in the central table then loads the WQE information, and marks the state of the entry VALID, while the lists that want the WQE store the assigned entry number, and mark the state of the slot storing the entry number VALID. Selecting the new entry from the AND of the lists and available entries ensures that a list that only infrequently sees qualifying WQEs will have an entry available for those rare WQEs.

If the ODU 240 is to load a new entry to a list, but the incoming WQE would not be one of the top-4 WQEs for the associated processor 270A-N in terms of priority, the list does not request that the WQE be loaded, but instead may configure a bit in a register or other identifier, the identifier corresponding to the IQ 215A-N from which the WQE was read. As a result of this configuration, the list may not request loading any other work from that IQ 215A-N until that IQ 215A-N has undergone a restart, thereby maintaining ordering of WQEs in the event that space on the list becomes available after the initial rejection of a WQE.

The valid state of each list, and the entry number at the front of each list are output to the corresponding WS 260A-N. If the priority of the WQE pointed to by the first slot in a list is of the highest priority available for the associated processor 270A-N, the ODU 240 notifies the WS 260A-N that the list is both VALID and READY.

When the WS 260A-N receives a GET_WORK request from the associated processor 270A-N, and the request is to be satisfied from the IQs 215A-N, the WS 260A-N notifies the ODU 240 with the entry number of the accepted work.

In the central table of the ODU 240, the state of the entry is changed from VALID to PENDING. At this time, the table also transmits to the WS 260A-N most of the information associated with the WQE 260A-N (i.e., group number, tag, address in memory). In the lists, the accepted entry number is invalidated (i.e., the state changes from VALID to EMPTY), and all other entries on lists "behind" the accepted entry move forward one slot toward the head of their lists. The process may be limited such that only one entry is accepted per cycle.

When the WS 260A-N has completed the acceptance process, and extracted the WQE from the IQs 215A-N, it again notifies the ODU 240, and the central table changes the state of the entry from PENDING to EMPTY. No invalidates are required in the lists at extract time, because the number of the extracted entry had already been removed from any list in which it had been present.

Entries in the table can also be invalidated for other reasons: a) the WS 260A-N could switch onto an atomic tag that matches the atomic tag of a WQE (or WQEs) in the table, b) the switch onto the atomic tag is due to a WQE being accepted from the table matching the atomic tag of another WQE (or WQEs) in the table, c) bumping (described further below), d) a flush of the entire contents of the table (other than entries in the PENDING state) due to a change in the group-mask or priority programming, and e) garbage collection (described further below). Any time an entry is invalidated, any slots corresponding to the invalidated entry numbers may be freed, and all other entries on lists "behind" the invalidated entries move forward toward the heads of their lists. Notification may also be sent to the WS 260A-N so that the WS 260A-N can stop processing of any GET_WORK request using that entry.

The central entry table may include comparators on the WQE tag values in each entry to allow for parallel computation of cases (a) and (b) above. The central entry table may also include comparators on the WQE 260A-N that effectively receive copies of commands sent to a local memory, allowing the entry table values for pointer tuples to remain up to date with the IQs 215A-N as represented in the memory.

A WQE that is requested by one or more processors 270A-N, and that had been loaded into the central entry table, can be pushed out of all the lists it was on due to those lists loading better-priority WQEs in front of it. Once an entry is not on any lists, the entry must be "garbage-collected." Accordingly, the ODU 240 may detect cases where an entry is valid but the entry number is not on any list, and invalidates the entry.

The GWE 230 may present a high-priority WQE that should be placed at the front of 1 or more lists. To accommodate this, a WQE already in the table must be "bumped," and replaced by the new WQE. There are several algorithms that can be implemented to select the entry to be bumped such as a) the lowest-weighted entry, where weight is a function of how many lists an entry appears on and how close to the front the entry is on each list, or b) the entry that appears furthest from the front of any list, regardless of how many lists the entry may appear on. The entry being bumped is invalidated from any list in which is appears. Simultaneously, the new WQE is loaded into the central entry table, while any list that wanted the new WQE loads the bumped entry number into the proper slot, adjusting other slots as appropriate. The same list may invalidate and reload the entry number in the same cycle.

The top-level control logic may also be responsible for informing the GWE when it needs to restart due to a WQE being accepted, bumping, ejecting, or garbage collecting.

Figure 4A:
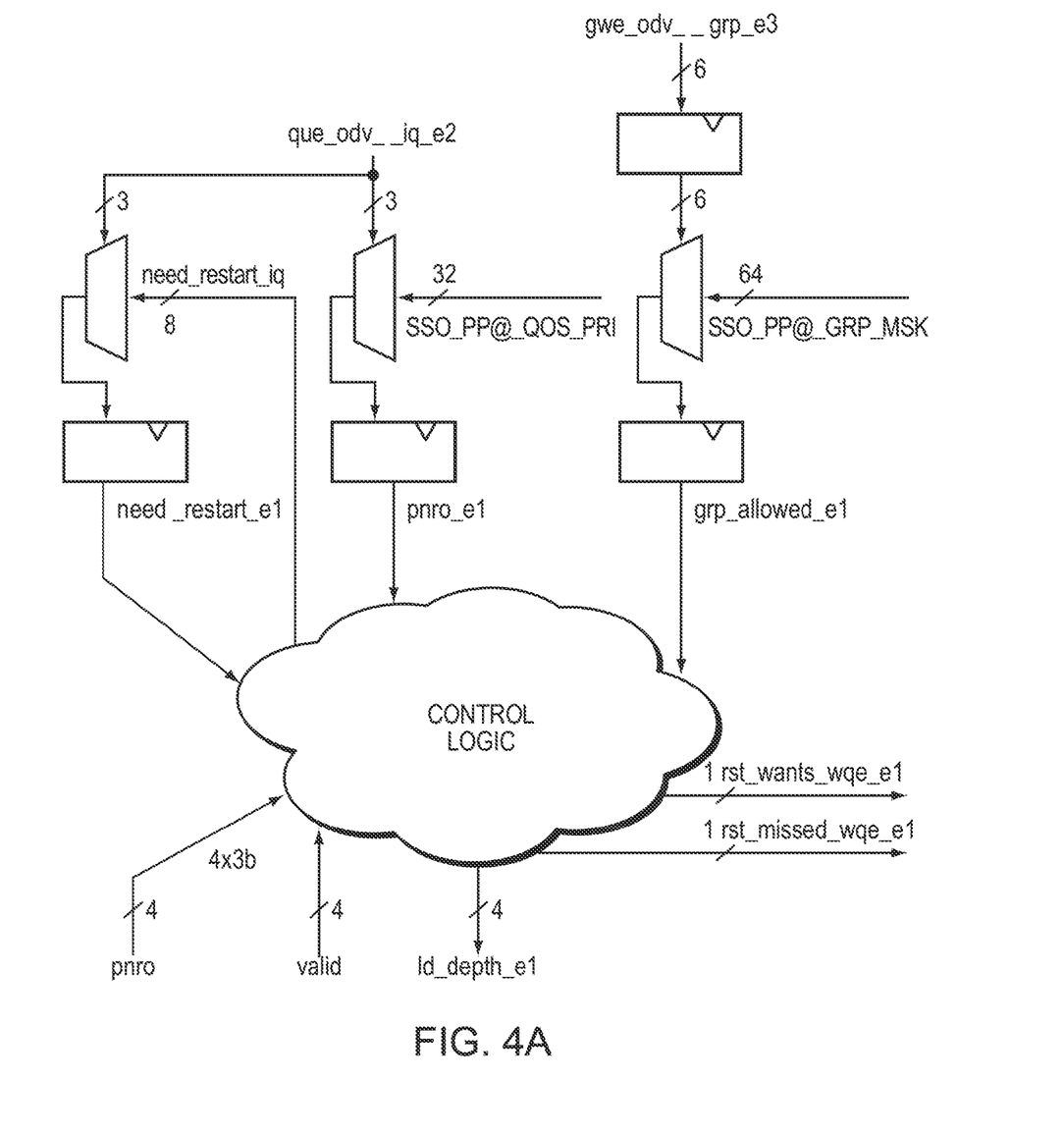
FIGS. 4A-B are block diagrams illustrating a portion of the ODU for maintaining a work list in one embodiment.
Figure 4B:
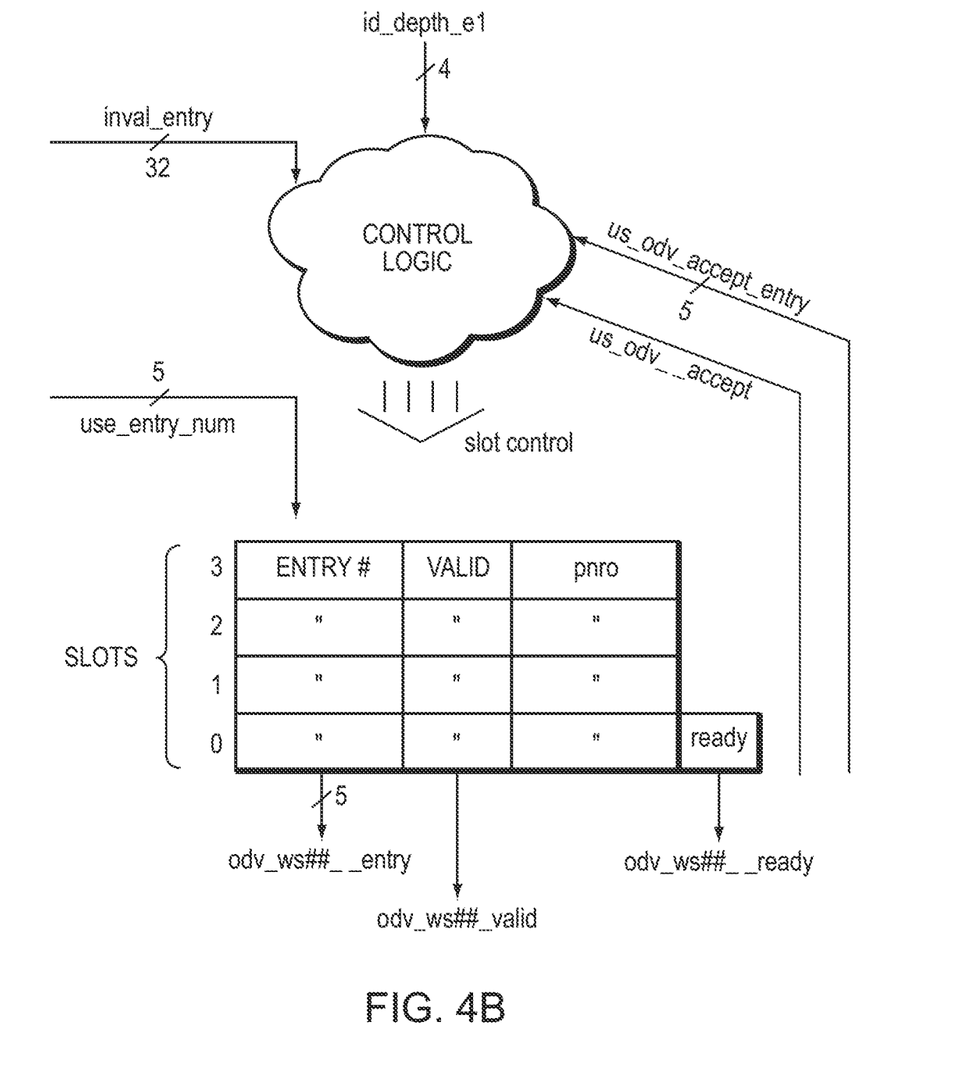

FIGS. 4A-B are block diagrams illustrating a portion of the ODU for maintaining a work list in one embodiment. With reference to FIG. 2, while the GWE 230 is processing a WQE for providing to the ODU 240, it sends a preview of the WQE's group number (grp) and IQ number (iq) to the all the ODU lists in parallel. Each ODU list checks whether the grp is allowed for the processor 270A-N associated with the list by selecting one bit from the associated tag. In parallel, each ODU list determines the priority of the incoming WQE by using the iq value to select a 4-bit priority value from the associated tag. Also in parallel, each ODU list determines if it has marked the IQ 215A-N as requiring a restart.

If the incoming WQE's grp is allowed for this list, and the priority is higher than the priority of an entry presently in slot 3 (the lowest priority slot of the list), and the IQ 215A-N does not need a restart, then the list sends a request indication to the ODU control logic, and indicates which slot it believes the incoming WQE should occupy on the list. If the grp is allowed, but the priority is lower or the same as the entry in slot 3, then the list sends a corresponding indication to the ODU top-level logic, and marks the IQ 215A-N of the "missed" WQE as needing to restart before this list can accept any new WQEs from that IQ 215A-N. The priority comparison is facilitated by using the valid bit of each slot, negated, as the most-significant bit of the priority value, meaning that any slot without a valid entry will automatically be processed at a lower priority than any non-reserved priority value.

A slot of a list can be invalidated through several means. For example, "accepts" sent from a respective WS 260A-N invalidate any slot where the slot's entry number matches the accepted entry number. Bumps, as described above, may invalidate all slots following the slot where the new entry has been added. Further, the GWE 230 can indicate that the WQE added on the prior cycle should not have been added, and thus if it was added, the slot that just added the WQE will be invalidated. In addition, an invalidate vector from the entry table can indicate anywhere from 0 to 32 entries that should be invalidated for any of the reasons described above with reference to FIG. 2.

Each list may determine which (if any, could be 0 to 4) of its slots should be invalidated each cycle. Based on information from the ODU top-level control, each list determines which of its slots should add a new WQE. The list uses "invalidate" and "insert" control signals to insert the incoming WQE's entry number into the proper slot, and to adjust the other slots appropriately.

Figure 5:
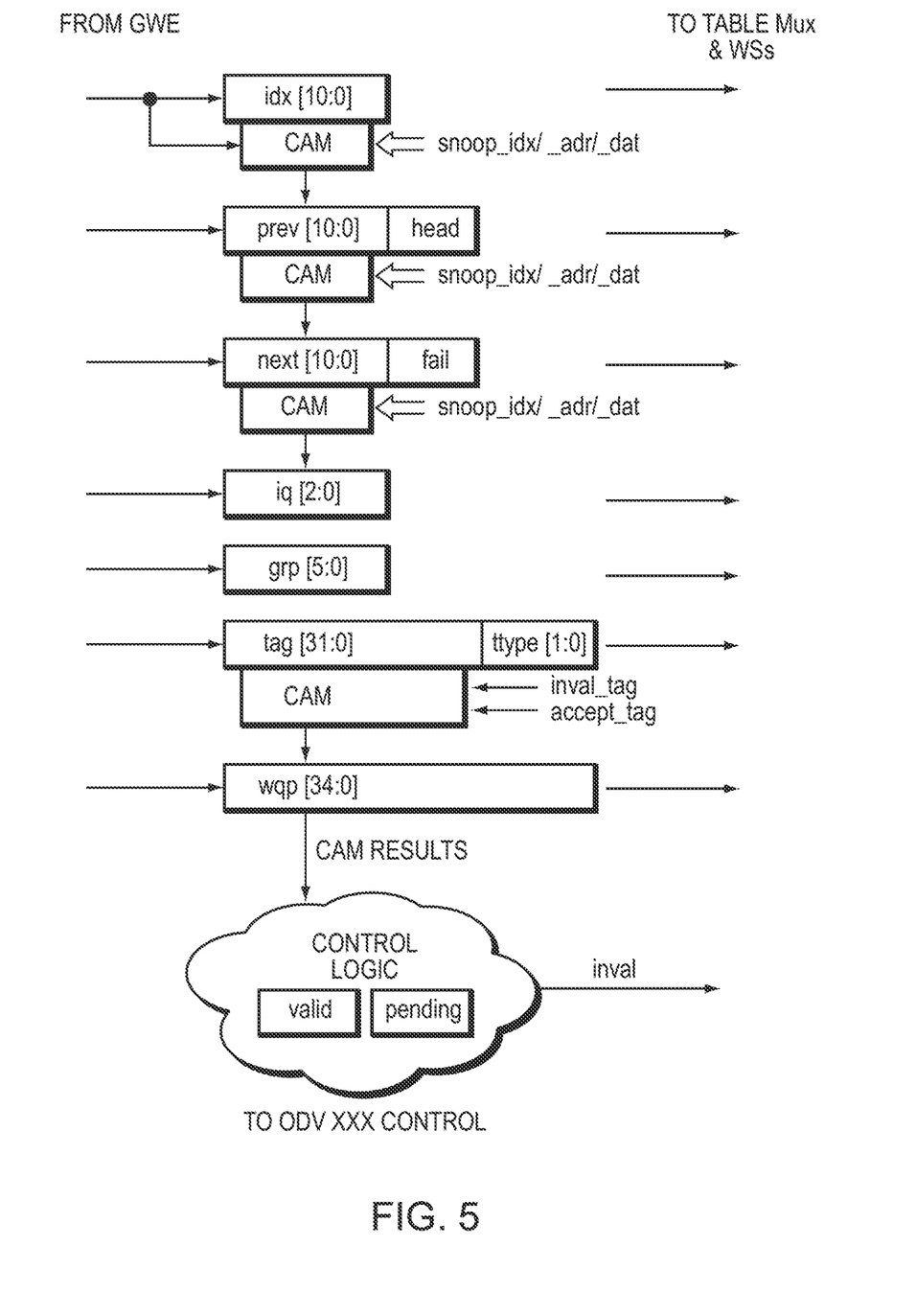
FIG. 5 is a block diagram illustrating the components of a work entry in one embodiment.

FIG. 5 is a block diagram illustrating the components of a work entry stored at an ODU table in one embodiment. Each of the 32 entries of the table may store the following information for a WQ:

a) The index (idx), previous (prev), and next (next) pointers (each 11 bits) describing the location of the WQE in the IQ's linked list structure. Sometimes these 3 values together are referred to as a pointer tuple. Associated with the prev pointer is a "head" bit; if set, it indicates the idx is at the head of some IQ and prev value is not meaningful. Associated with the next pointer is a "tail" bit; if set, it indicates the idx is (or was as some point) at the tail of some IQ and the next value is not meaningful.

b) The group number (grp) of the WQE—6 bits.

c) The IQ number (iq) of the WQE—3 bits.

d) The tag (tag, 32 bits) and tag-type (ttype, 2 bits) of the WQE.
e) The WQE pointer (wqp) of the WQE—35 bits.
f) A valid bit and a pending bit.

The GWE 230 sends the above information to the ODU 240. Within each entry are a number of comparators ("CAMs") used to determine the following:
  a) whether an incoming WQE has already been stored in a valid entry (idx vs. incoming idx),
  b) whether an incoming WQE is allowed to bump a valid entry (iq vs. incoming iq),
  c) when prev and next pointers should be updated due to changes in the IQ linked lists,
  d) whether a valid WQE should be invalidated due to a WS switching onto an ATOMIC tag, and
  e) whether a valid WQE should be invalidated due to a WS accepting another entry using the same ATOMIC tag.

In addition to the conditions of (d) and (e) above, entries can also be invalided when the full ODU is flushed due a configuration change, or garbage collection when no list holds the entry number any longer. When an Entry is invalidated, or multiple Entries are simultaneously invalidated, all the ODU lists and the WS are informed with an indication signal.

While this invention has been particularly shown and described with references to example embodiments thereof, it will be understood by those skilled in the art that various changes in form and details may be made therein without departing from the scope of the invention encompassed by the appended claims.

What is claimed is:

1. scheduling processor for scheduling work for a plurality of processors, the scheduling processor comprising:
  an add work engine (AWE) configured to forward a work queue entry (WQE) to one of a plurality of input queues (IQs);
  an on-deck unit (ODU) comprising a table having a plurality of entries, each entry storing a respective WQE; and a plurality of lists, each of the lists being associated with a respective processor configured to execute WQEs and comprising a plurality of pointers to entries in the table, each of the lists adding a pointer based on an indication of whether the associated processor accepts the WQE corresponding to the pointer; and
  a get work engine (GWE) configured to move WQEs from the plurality of IQs to the table of the ODU.

2. The scheduling processor of claim 1, wherein the indication is received from the associated processor itself.

3. The scheduling processor of claim 1, wherein the indication is based on one or more of: a work group corresponding to the WQE, a comparison of a priority of the WQE against a priority of other WQEs stored at the list, and an identifier of the IQ storing the WQE.

4. The scheduling processor of claim 1, further comprising a plurality of work slots, each of the work slots being associated with a respective processor and configured to receive a WQE from the list associated with the processor.

5. The scheduling processor of claim 4, wherein the respective processor executes the WQE at the work slot.

6. The scheduling processor of claim 4, wherein each of the lists includes pointers to a common WQE in the table.

7. The scheduling processor of claim 6, wherein each of the lists is updated by removing a pointer when the associated WQE is moved to a work slot of a processor not associated with the list.

8. method of processing work requests in a network, comprising:
  forwarding a work queue entry (WQE) to one of a plurality of input queues (IQs);
  moving the WQE from the IQ to one of a plurality of entries at a table;
  configuring a plurality of lists to store a plurality of pointers to entries in the table, each of the lists being associated with a respective processor configured to execute WQEs and; and
  adding a pointer to one of the plurality of lists based on an indication of whether the associated processor accepts the WQE corresponding to the pointer.

9. The method of claim 8, wherein the indication is received from the associated processor itself.

10. The method of claim 8, wherein the indication is based on one or more of: a work group corresponding to the WQE, a comparison of a priority of the WQE against a priority of other WQEs stored at the list, and an identifier of the IQ storing the WQE.

11. The method of claim 8, further comprising receiving a WQE from the list to one of a plurality of work slots, each of the work slots being associated with a respective processor.

12. The method of claim 11, further comprising executing, at the respective processor, the WQE at the work slot.

13. The method of claim 11, wherein each of the lists includes pointers to a common WQE in the table.

14. The method of claim 13, further comprising updating each of the lists by removing a pointer when the associated WQE is moved to a work slot of a processor not associated with the list.

* * * * *